(12) United States Patent
Wedi (10) Patent No.: US 12,398,550 B2
(45) Date of Patent: Aug. 26, 2025

(54) ADAPTER FOR A DRAIN DEVICE (71) Applicant: wedi GmbH, Emsdetten (DE)

(72) Inventor: Stephan Wedi, Emsdetten (DE)

(73) Assignee: WEDI GmbH, Emsdetten (DE)

(*) Notice: Subject to any disclaimer, the term of this patent is extended or adjusted under 35 U.S.C. 154(b) by 0 days.

(21) Appl. No.: 17/771,052

(22) PCT Filed: Mar. 17, 2022

(86) PCT No.: PCT/EP2022/056935
§ 371 (c)(1),
(2) Date: Sep. 21, 2023

(87) PCT Pub. No.: WO2023/174540
PCT Pub. Date: Sep. 21, 2023

(65) Prior Publication Data
US 2024/0151022 A1 May 9, 2024

(51) Int. Cl.
E03F 5/04 (2006.01)
F16J 15/10 (2006.01)

(52) U.S. Cl.
CPC .......... *E03F 5/0408* (2013.01); *F16J 15/106* (2013.01)

(58) Field of Classification Search
CPC ....... E03F 5/0408; E03F 4/0407; F16J 15/106
USPC .......................................................... 4/679
See application file for complete search history.

(56) References Cited

U.S. PATENT DOCUMENTS

| | | | | |
|---|---|---|---|---|
| 3,896,511 A * | 7/1975 | Cuschera | ................. | E03C 1/22 4/288 |
| 4,622,703 A * | 11/1986 | Cuschera | ................. | E03C 1/22 277/606 |
| 11,268,271 B2 * | 3/2022 | Say | ........................ | E03F 5/0411 |
| 11,284,751 B2 * | 3/2022 | Droessler | ............... | A47K 3/405 |
| 2015/0275497 A1 * | 10/2015 | Nyce | ..................... | E03F 5/0407 52/302.1 |
| 2018/0279840 A1 * | 10/2018 | Ruiz Perez | ........... | E03F 5/0409 |
| 2022/0195712 A1 * | 6/2022 | Wedi | ...................... | F16J 15/106 |

FOREIGN PATENT DOCUMENTS

DE 102019110322 A1 10/2020

* cited by examiner

*Primary Examiner* — Huyen D Le
(74) *Attorney, Agent, or Firm* — Laurence P. Colton; Smith Tempel Blaha LLC (57) ABSTRACT

An adapter for a drain device, for installation in a floor panel, and having a receptacle with an upper inlet opening through which waste water can flow into the drain device, and parts which can be connected in a fluidic manner to a drain pipe and the receptacle, so that waste water which has passed through the inlet opening can enter the drain pipe. To improve the sealing function, the adapter has a base part having an inner thread, a first coupling point to the drain pipe, a second coupling point to the receptacle and which couples the receptacle to the drain pipe, a sealing ring that can be installed in the base part to seal the adapter from the drain pipe, and a compression ring with an outer thread compatible to the inner thread of the base part for exerting a compressive force on the sealing ring.

13 Claims, 8 Drawing Sheets

ADAPTER FOR A DRAIN DEVICE

CROSS REFERENCE TO RELATED APPLICATIONS

This patent application claims the benefit of and priority on International Application No. PCT/EP2022/056935 having an international filing date of 17 Mar. 2022.

BACKGROUND OF THE INVENTION

Technical Field

The invention relates to an adapter for a drain device that is provided for installation in an opening of a floor panel, preferably a shower floor panel. Such adapters are used to connect a drain body installed in a floor surface with a connecting piping system.

Prior Art

Known from DE 10 2019 110 322 A1 is an adapter that can be mounted on a drain body and which produces a connection between said drain body and a piping system. Used water that initially collects in the drain body is thus directed through the adapter into the piping system. The adapter is sealed from the piping by means of a special seal which has an annular outer contour that can be inserted into a contour provided on the adapter. In order to couple the adapter to the piping system, the seal can first be fitted on the drain pipe. Then the adapter is attached.

The seal has an upper, inward-facing collar that protrudes over the pipe end of the drain pipe from the outside to the inside when mounted. There is also a collar on the underside of the seal into which a pipe stub protruding from the drain body can be inserted. Furthermore, the seal comprises flexible sealing lips that fit snugly against the outer wall of the drain pipe when the adaptor is pushed onto it. The sealing lips exert a relatively low contact pressure on the drain pipe on the one hand and also seal it on the other. The pressure exerted by the seal on the drain pipe depends on the seal material and the tightness of the fit: The tighter the fit and the harder the seal material, the higher the pressure exerted by the seal lips on the drain pipe, but at the same time the more difficult it is to mount the adapter on the drain pipe.

BRIEF SUMMARY OF THE INVENTION

The object of the invention is to overcome the described disadvantages and to propose an adapter which is easy to install and provides a fixed, but nevertheless easily detachable connection between the drain pipe and the drain body This object is achieved by an adapter for a drain device that is provided for installation in an opening of a floor panel, preferably a shower floor panel, and wherein the drain device comprises a receptacle for the installation in the floor panel with an upper inlet opening through which waste water can flow into the drain device, and parts which can be preassembled in the floor area and which can be connected in a fluidic manner to a drain pipe and the receptacle, so that waste water which has passed through the inlet opening can enter the drain pipe, characterized in that the adapter comprises the following components: a base part having an internal thread, wherein the base part comprises a first coupling point to the drain pipe and a second coupling point to the receptacle and couples the receptacle to the drain pipe in the assembled state, a sealing ring that can be installed in the base part to seal the adapter from the drain pipe, and a compression ring with a outer thread compatible to the inner thread of the base part for exerting a compressive force on the sealing ring, so that the sealing ring can be pressed against the drain pipe by means of the compression ring and the first coupling point comprises a press-fit connection.

The adapter according to the invention is provided for a drain device, which preferably may be a shower floor drain device. The drain device comprises a receptacle that can be installed in a floor panel and a drain pipe that can be flow-connected to the receptacle. The receptacle is thus understood to be a component that can be installed in the base panel and which forms a kind of water inlet housing.

The adapter itself comprises the following components:
a base part which has a first coupling point to the drain pipe and a second coupling point to the receptacle and couples the receptacle to the drain pipe in the assembled state,
a sealing ring that can be installed in the base part to seal the adapter from the drain pipe, and
a compression ring for exerting a compressive force on the sealing ring The sealing ring comprises a deformable, flexible material, for example plastic or rubber. Preferably, a receptacle compatible with the sealing ring, for example a groove, is provided in the base element. The sealing ring can be easily inserted into such a groove and securely fixed at the intended installation location. As an alternative or in addition to a groove, the base element can also have a lower collar, on whose contour the sealing ring inserted into the base element can be supported.

A clearance fit is provided between the sealing ring and the drain pipe in the unloaded state, which is dimensioned in such a way that the adapter with the installed sealing ring can be easily fitted onto the drain pipe. In this state, the sealing ring does not yet exert a sealing function. Rather, the sealing function is only attained by the sealing ring in the adapter being deformed by means of a force exerted on the sealing ring in such a way that it not only closes a gap formed between the drain pipe and the adapter, but is also deformed or crimped in this gap with a high compressive force.

The force exerted on the sealing ring is applied by screwing the compression ring into the base element. The compression ring is preferably not screwed into the base element manually, but with a suitable tool, since a tool can exert a higher torque in the compression ring and thus also a higher pressure force on the sealing ring. As the compression ring is screwed in, its underside comes closer and closer to the sealing ring until the compression ring and the sealing ring finally make contact with each other. If the screwing-in process is continued, the compression ring presses on the sealing ring, deforms it and creates the desired compression connection between the drain pipe and the adapter. As the gap between the drain pipe and the adapter is completely filled by the deformed sealing ring during this pressing process, the drain pipe and adapter are also reliably sealed.

Preferably, the compression ring is not screwed into the base element by means of an external tool, but by means of an insert integrated into the adapter. This insert may be a part which can be fitted into the base element above the compression ring and which is provided for tensioning the sealing ring fitted into the base element. The compression ring and the insert preferably have connecting elements that are compatible with each other to create a form-fit connection. This makes it very easy to apply the torque required to screw in the compression ring first to the insert and then transfer it from the insert to the compression ring. The sealing ring can thus be pressed against the drain pipe particularly easily and with high pressure force by means of the combination of compression ring and insert. The compatible connecting elements can be, for example, a type of toothing.

A tight clearance fit is preferably provided between the compression ring and the insert, so that the insert can be easily separated from the compression ring on the one hand, but on the other hand a torque acting on the insert can also be securely transmitted to the compression ring.

In one preferred embodiment of the invention, a spacer is provided between the sealing ring and the compression ring. A spacer is a tube-like part that can be inserted into the base part of the adapter and forms a kind of spacer between the compression ring and the sealing ring. In the adapter, the spacer is located between the sealing ring and the compression ring when mounted. The spacer is pressed onto the sealing ring by the screwing-in movement of the compression ring. The underside of the compression ring, which rotates as it is screwed in, does not rub directly against the flexible sealing ring, but against the top side of the spacer. Preferably, the spacer itself does not rotate or rotates only insignificantly despite the rotational movement of the compression ring. The spacer is thus moved linearly in the direction of the compression ring.

The top side of the spacer is designed in such a way that it is not damaged by the aforementioned rotational friction of the compression ring. Put simply, the linear-moving spacer merely compresses the sealing ring, but does not rub along the sealing ring.

In a preferred embodiment, the spacer comprises a seal for additional sealing of the adapter against the drain pipe. Sealing is thus achieved on the one hand by the compressible sealing ring and on the other hand by the seal provided on the spacer. This seal provided on the spacer has an inner diameter that is slightly smaller than the outer diameter of the drain pipe. The seal thus forms a guide when the adapter is fitted onto the drain pipe. In addition, the seal closes any gap remaining between the drain pipe and the housing when the drain pipe is inserted flush. In addition to the improved appearance, no waste water can penetrate and remain there, so that unpleasant odors are avoided.

Preferably, the seal fitted in the spacer is glued in place. It can therefore neither be forgotten nor incorrectly mounted during assembly.

The spacer can have at least one nominal separation point at which it can be divided. Preferably, the tubular spacer can comprise two nominal separation points by means of which it can be divided into two shell-like halves. Such a division enables the subsequent installation of a spacer in an adapter even if a receptacle located above the adapter in the base panel or a component of the drain device located on the receptacle, for example a narrow channel drain, only has a passage to the drain pipe that is smaller than the diameter of the spacer.

Although the spacer is usually inserted into the adapter before the adapter is assembled, it can happen that the installation of the spacer is forgotten during assembly. In order to allow the spacer to be pushed through an opening in the receptacle that is smaller than the diameter of the spacer, the spacer is preferably divided into two parts at the intended nominal separation points. The two half-shells created in this way can be inserted one after the other through the opening of the inlet housing and then positioned in the adapter above the sealing ring at the intended location.

In cases where the opening of the inlet housing is only minimally smaller than the spacer, it may also be sufficient to separate the spacer only at a nominal separation point. A spacer split in this way can be twisted in a spiral movement and pushed in one piece from above through the opening of the inlet housing into the adapter.

The first coupling point, which connects the adapter to the drain pipe, is formed as already explained by the compression ring being screwed into the receptacle and consequently compressing the sealing ring and pressing it between the receptacle and the drain pipe. The compression ring and receptacle thus each comprise a thread. In order to position these two threads in the correct position in relation to each other when screwing them in and to prevent the part provided with the external thread from being placed obliquely in relation to the part provided with the internal thread, a bayonet lock can be provided which is integrated into the threaded connection—and thus also into the coupling point.

A bayonet lock is a mechanical connection of two cylindrical parts in their longitudinal axis that can be quickly made and released. The parts are connected and separated by inserting them into each other and turning them in opposite directions. In the case of a bayonet lock integrated in a thread, the two components are first turned against the direction of rotation of the thread with little pressure to ensure correct positioning. In a predefined position of the two parts in relation to each other, the thread is interrupted and the part provided with the external thread slides over the part provided with the internal thread in the direction of the longitudinal axis of the thread. In simple terms, the two threads snap into each other and are thereby positioned in the correct position in relation to each other. The direction of rotation can then be changed and the internal thread can be screwed into the external thread.

In a preferred embodiment, the insert may comprise openings for collecting impurities present in the waste water, for example hair, and thus have a sieve-like effect. The insert thus has a dual function: on the one hand, it serves to transmit a torque to the press ring and to create the press connection between the adapter and the drain pipe; on the other hand, it serves to prevent foreign bodies from entering the drain pipe and thus to reduce the risk of pipe blockages.

Preferably, the insert comprises a receptacle for a tool, in particular a screwdriver, so that the insert can be inserted or removed from the adapter by means of a tool. This receptacle can be, for example, a slot, a cross-slot or a Torx connection. The receptacle is preferably mounted in the center axis of the insert part so that a torque introduced into the insert part with the tool via the receptacle can be transmitted evenly to the compression ring coupled to the insert part. It is therefore particularly advantageous that no special tools are required to screw in the insert.

The second coupling point, which connects the adapter to the receptacle and thus to the water inlet housing, is preferably formed by a threaded connection. For this purpose, a thread can be provided on the adapter which is compatible with a thread attached to the receptacle. Preferably, this screw connection comprises a seal which is compressed when the adapter is screwed into the receptacle and seals the transition area from the adapter to the receptacle.

Analogous to the first coupling point, the second coupling point can also comprise a bayonet lock. For this purpose, the thread of the adapter can be formed as a first part of a bayonet lock, which is compatible with a second part of the bayonet lock attached to the receptacle. This results in the advantages already described in connection with the bayonet lock of the first coupling point of a simple and coaxial positioning of the components to each other.

The second coupling point may further comprise, on one of the two components, namely the adapter or the receptacle, a catch which is engageable in a recess of the other component which is compatible therewith. When the threaded connection reaches a predefined insertion depth, the catch and recess arrive in a mutually compatible position. The catch, which is preferably elastic and in a pre-tensioned position when the threads are screwed in, relaxes in this position and engages in the recess. This fixes the adapter, which can be screwed into the receptacle, and it can only be unscrewed from the receptacle when the catch is deliberately pushed out of the recess, usually with the aid of a lever-like tool. Only then is it possible to remove the adapter from the receptacle. The catch thus forms a safeguard against unintentional unscrewing. Such unintentional unscrewing can occur if other parts of the drain device, which also comprise a threaded connection, are to be loosened and the torque applied is wholly or partially not transferred to the thread to be loosened, but to the threaded connection of the receptacle and adapter.

In a preferred embodiment, it may be provided that the first coupling point for connecting the adapter to the drain pipe and the second coupling point for connecting the adapter to the receptacle each comprise a thread oriented in opposite directions. This not only prevents the other coupling point from being loosened when one coupling point is tightened, but on the contrary, one coupling point is additionally tightened when a torque is applied to the other coupling point.

BRIEF DESCRIPTION OF THE DRAWINGS

Further measures improving the invention are illustrated in more detail below with the description of preferred embodiments of the invention with reference to the figures, which show.

DETAILED DESCRIPTION OF PREFERRED EMBODIMENTS

In the following figures, identical or similar elements can be provided with identical or similar reference numbers. Furthermore, the figures of the drawings contain numerous features in combination in the description as well as in the claims. It is clear to a person skilled in the art that these features can also be considered individually or that they can be combined to form further combinations not described in detail here. The invention expressly extends also to such embodiments which are not given by combinations of features from explicit back references in the claims, whereby the disclosed features of the invention can be combined with each other in any way, inasmuch as this is technically reasonable. The exemplary embodiments shown in the figures thus have only a descriptive character and are not intended to limit the invention in any way.

Terms such as "upper", "lower", "below", "left", or "right" refer to the positioning of the components of the drain device as represented in the drawings which corresponds to the arrangement in the operating state.

Figure 1:
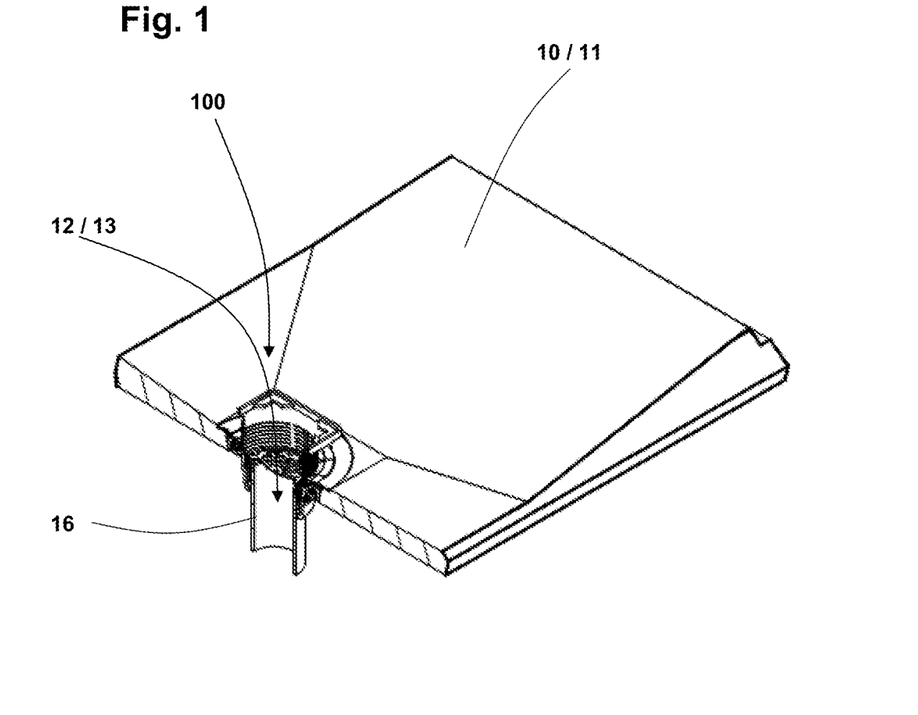
FIG. 1 is a drain device installed in a floor panel in a perspective sectional view.

FIG. 1 shows a drain device 100 installed in a floor panel 10 in a perspective sectional view. The floor panel 10 in the shown exemplary embodiment is a shower floor panel 11, which has a slope directed towards an inlet opening 13. Waste water entering through the inlet opening 13 is fed to a drain pipe system 16 connected to the drain device 100.

In the illustrated exemplary embodiment, the drain device 100 is installed in a sanitary room and is fitted in an opening 12 of the shower floor panel 11. The drain device 100 shown does not comprise an anti-odor trap integrated into the drain cup. In other exemplary embodiments, it may also be provided that the drain device itself comprises an anti-odor trap.

Figure 2:
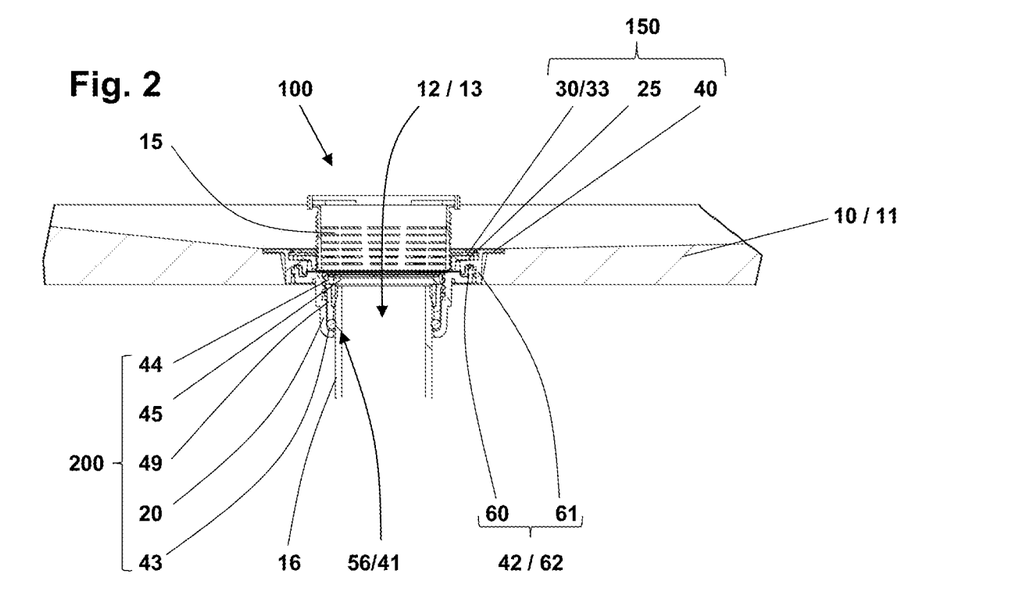
FIG. 2 is the floor panel with drainage device according to FIG. 1 in a sectional side view.

FIG. 2 shows the floor panel 11 with the drainage device 100 in a side sectional view. An adapter 200 is fitted onto the drain pipe 16 and fixed at a first coupling point 41 by means of a press-fit connection 56. At a second coupling point 42, the adapter 200 is screwed to a receptacle 40 by means of a screw connection 62. A bayonet catch 63 is integrated into the screw connection 62. The bayonet catch 63 facilitates the alignment of the components to be screwed together.

Further details of the adapter 200 are described in more detail below in relation to FIGS. 15 to 23.

Together with a retainer 25 and a fixing element 30, which in the present case is a snap ring 33, the receptacle 40 forms an adjusting device 150. The retainer 25 of the adjusting device 150 is connected to an extension element 15 via a thread. An intermediate support 66 may be arranged on the extension element 15, on which a cover 14 is provided for closing the inlet opening 13. The cover 14 can be removed to carry out cleaning and maintenance work. In the fully assembled state, the surface of the cover 14 is preferably aligned flush with the surface of a covering applied to the shower floor 11, which may be floor tiles, for example.

The flush fit of cover 14 to the surface of the shower floor covering is adjusted during installation of the shower floor 11. In FIG. 2, it can be seen that the extension element 15 clearly projects above the surface of the shower floor 11. This is due to the fact that the height of the extension element 15 in the initial stage is initially very generously dimensioned to also allow for the use of thick floor coverings. In order to roughly adjust the height of the extension element 15 to the height of a selected floor covering, the extension element 15 is therefore first shortened on its underside so that it is roughly adjusted to the height of the selected floor covering. The fine height adjustment, accurate to the millimeter or even to the tenth of a millimeter, is carried out by means of the threaded connection of extension element 15 and retainer 25 after the floor covering has been applied.

The adjusting device 150 provides, on the one hand, the described height adjustment and, on the other hand, a horizontal adjustment of the cover 14 for uniform alignment with respect to the joints surrounding the cover 14.

Figure 3:
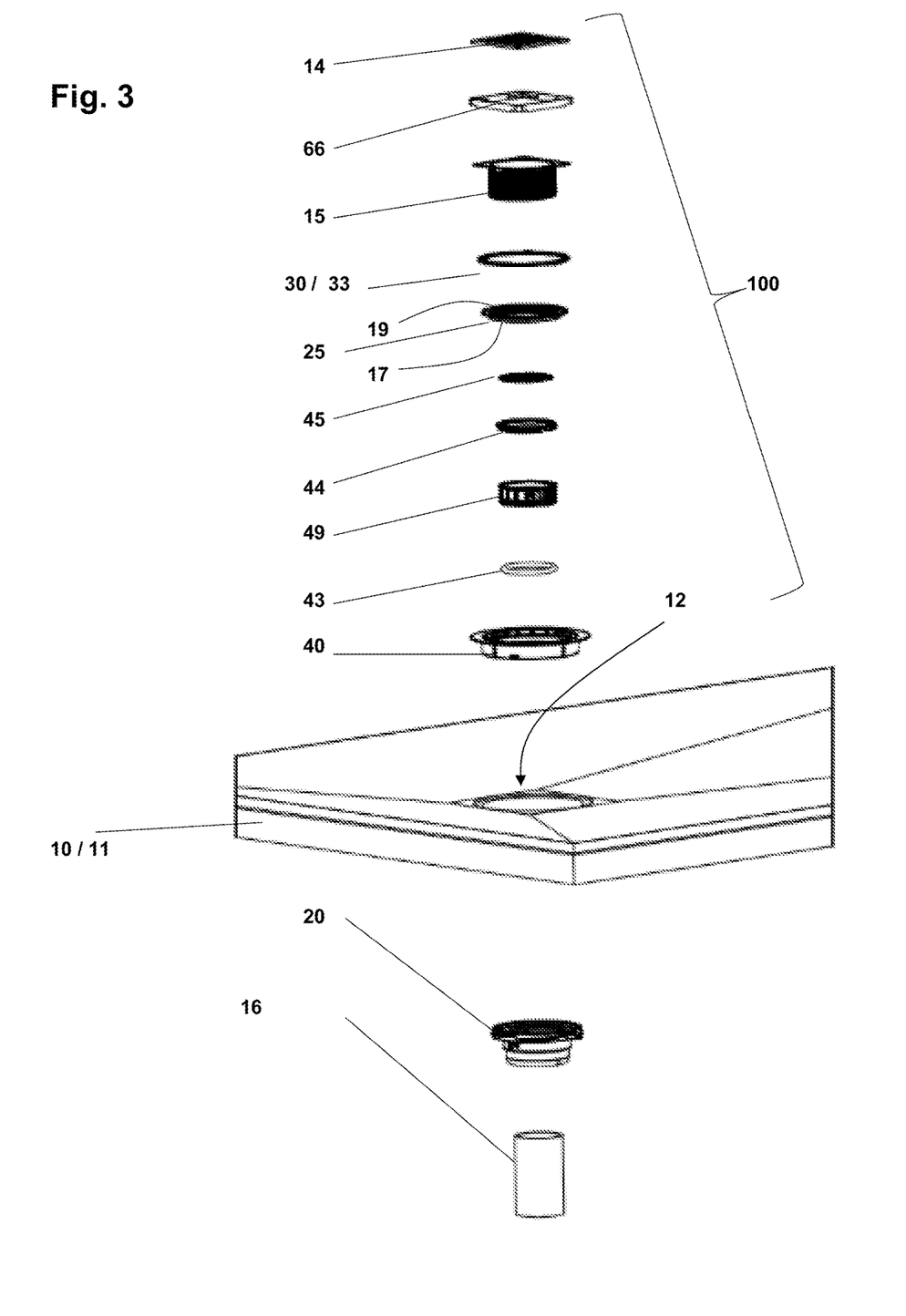
FIG. 3 is a floor panel and a drain device to be installed in the floor panel in an exploded view.

FIG. 3 shows an exploded view of the components of the drain device 100. The cover 14 can preferably be placed in a form-fitting manner on an intermediate support 66 provided in the illustrated embodiment. The intermediate support 66 may also have positive locking contours and is thus able to be placed on the extension element 15 in a form-fitting manner.

The extension element 15 has an external thread 17 that can be screwed into an internal thread 29 of the retainer 25.

The retainer 25 is held in a pre-assembled state Z1 in a housing-like structure and is movable in this housing-like structure. The housing-like structure is located in an area between the fixing element 30—in the present case: the snap ring 33—and the receptacle 40.

In the illustrated exemplary embodiment, the receptacle 40 can be inserted into the opening 12 of the floor panel 10 from above. To assemble the drain device 100, the retainer 25, the snap ring 33, the extension element 15, the intermediate support 66, and the cover 14 are also inserted into the drain device 100 from above and can be easily dismantled if necessary, for example for cleaning work.

In contrast, a base part 20 provided on the adapter 200 is first attached from below to the receptacle 40 already inserted in the floor panel 10. Next, the floor panel 10 with the inserted receptacle 40 and the base part 20 of the adapter 200 attached to the underside of the receptacle 40 can be fitted onto the drain pipe 16. The base part 20 is fixed to the drain pipe 16 by means of the press-fit connection 56 formed by the sealing ring 43, the spacer 49, the compression ring 44, and the insert 45. The exact functionality is explained in more detail below.

Figure 4:
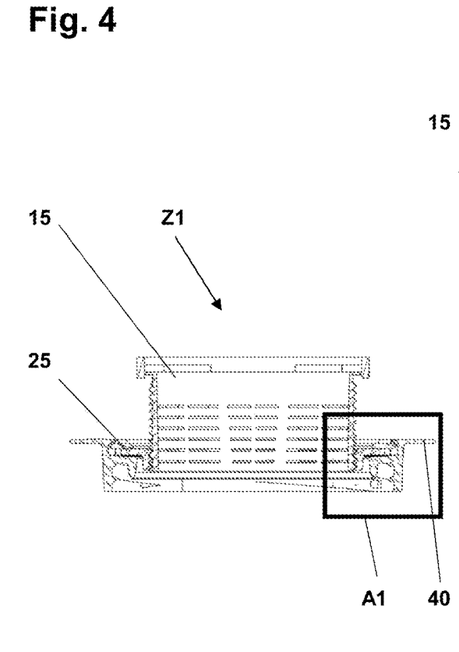
FIG. 4 are some components of the drainage device which together form an adjusting device in a cut side view.
Figure 5:
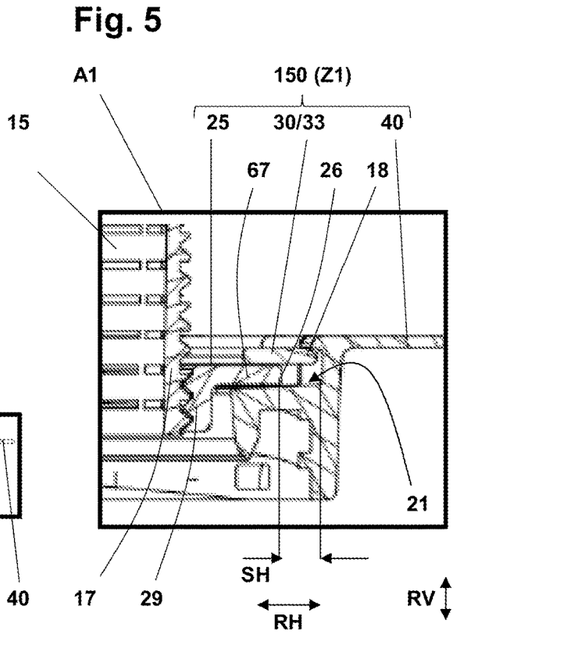
FIG. 5 is a detail enlargement from FIG. 4.
Figures 6, 7:
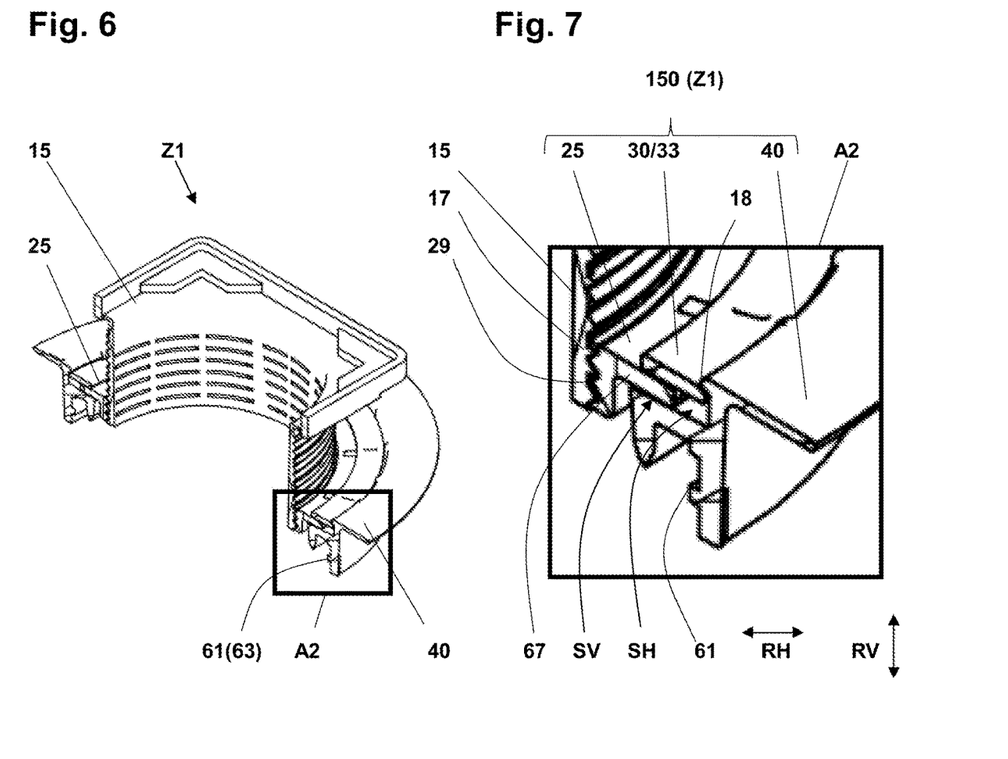
FIG. 6 are the components according to FIG. 4 in a sectional perspective view.
FIG. 7 is a detail enlargement from FIG. 6.

FIGS. 5 to 8 illustrate the construction and operation of the adjusting device 150, with FIG. 5 showing an enlarged section A1 from FIG. 4 and FIG. 7 showing an enlarged section A2 from FIG. 6.

The adjusting device 150 is shown in the pre-assembled state Z1. In this pre-assembled state Z1, the extension element 15 is screwed with its external thread 17 into the internal thread 29 of the retainer 25.

The retainer 25 has a circumferential flange 67 with an outer contour 26. In the pre-assembled state Z1, the flange 67 rests on a bearing surface 21 (cf. FIG. 12) provided in the receptacle 40. Above the flange 67, a snap ring 33 provided with projections 34 is engaged in recesses 23 of the receptacle 40 compatible with the projections 34. The projections 34 and the recesses 23 form a snap-fit connection 18 between the snap ring 33 and the receptacle 40.

Snap ring 33 and receptacle 40 thus form a housing-like structure that has approximately the shape of a horizontal U or a circumferential groove that is open towards the center axis. This groove surrounds the flange of the retainer 25 in the pre-assembled state Z1. The retainer 25—and thus also the extension element 15—are movable in horizontal direction RH and vertical direction RV within the groove. This mobility is indicated by a horizontal play SH, which in the illustrated embodiment is 5 mm, and a vertical play SV, which is less than 1 mm and serves to prevent jamming of the flange 67 between the snap ring 33 and the receptacle 40.

The horizontal and vertical play is maintained until a floor covering is applied to the shower floor panel 11. This means: In the course of the installation activities, the floor panel 10 and the drain device 100 are installed first. After the floor panel is in place and connected to the pipe 16, a floor covering (not shown in the drawings) is applied to the floor panel. After the floor covering has been applied, the height of the cover 14 placed on the extension element 15 can be adjusted exactly to the height of the floor covering by screwing the extension element 15 into the retainer 25. Furthermore, the horizontal positioning of the cover 14 can also be finely adjusted, since the adjusting device 150 is still in the pre-assembled state Z1 at this point.

After the position of the cover 14 has been finely adjusted in the vertical and horizontal directions RV, RH, the remaining open joints around the cover 14 are then finally grouted with a suitable mortar. This transfers the adjusting device 150 from the pre-assembled state Z1 to a fully assembled state. In the fully assembled state, the adjusting device 150 is thus fixed and only the cover 14 can still be removed from its holder.

Figure 8:
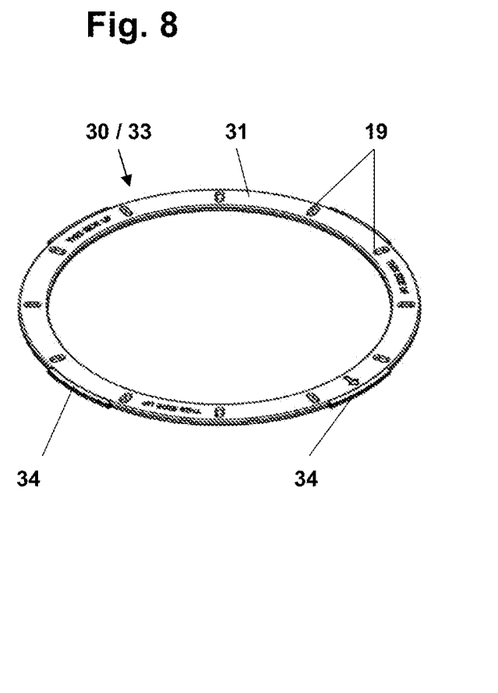
FIG. 8 is a fixing element in the form of a snap ring in a top view.
Figure 9:
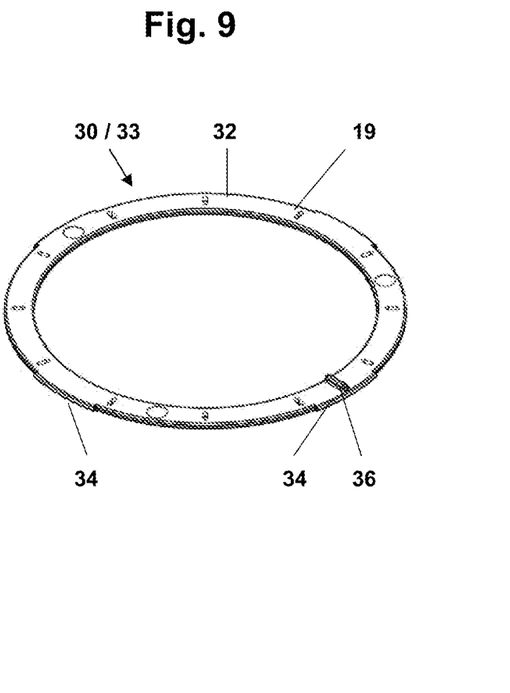
FIG. 9 is the fixing element according to FIG. 8 in a view from below.

FIGS. 8 and 9 show a fixing element 30 in the form of a snap ring 33 in a perspective view from diagonally above (FIG. 8) and diagonally below (FIG. 9). In the exemplary embodiment shown, the snap ring 33 is made of a flexible plastic and includes four projections 34 that are insertable into the compatible recesses 23 of the receptacle 40 to form a snap-fit connection 18. Furthermore, the snap ring 33 has some continuous openings 19 which, in the fully assembled state, serve to drain off seepage water entering the drain.

FIG. 9 also shows a projection 36 which is provided on the underside 32 of the snap ring 33 and which, in the pre-assembled state Z1 of the adjusting device 150, is arranged in a recess 35 provided in the retainer 25, where it limits the horizontal play SH of the retainer 25.

Figure 10:
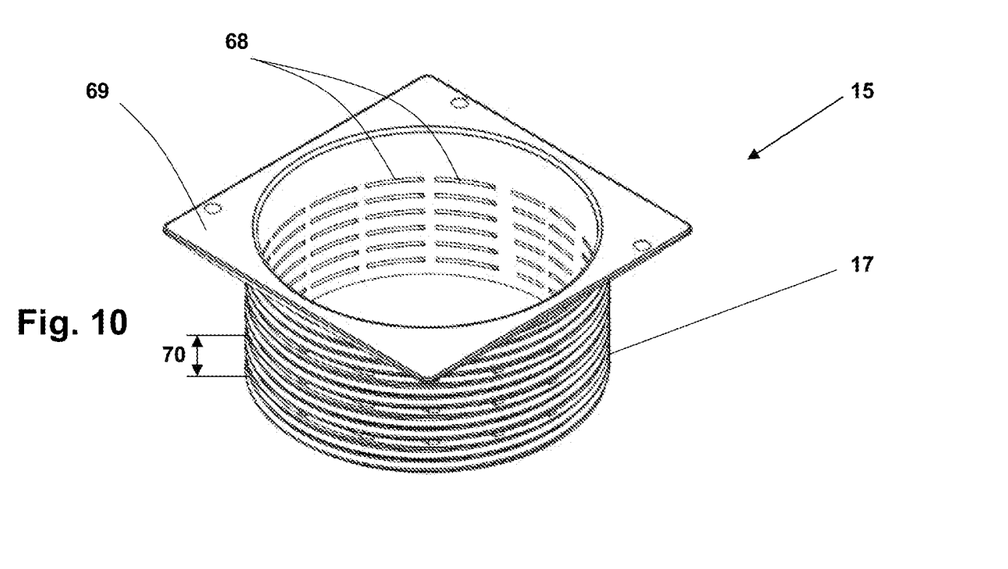
FIG. 10 is an extension element for a cover in a perspective view.

FIG. 10 shows the extension element 15, which has a tube-like contour with an external thread 17 and a flange 69 adjoining the tube-like contour. Openings 68 are made in the tube-like contour, which serve to drain off seepage water in the same way as the openings 19 in the snap ring 33. The tube-like contour can be shortened by a piece of length 70 at the installation site, for example with a cutter knife, in order to adapt it to the thickness of the floor covering to be applied.

Figure 11:
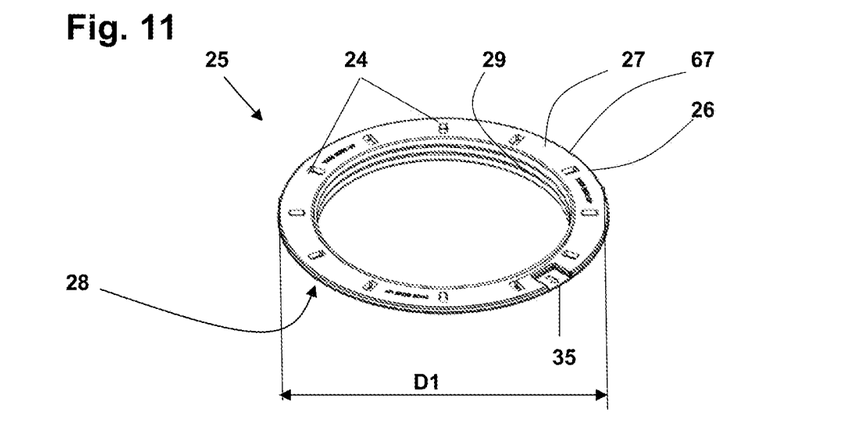
FIG. 11 is a retainer for the extension element shown in FIG. 10 in a perspective view.

FIG. 11 shows the retainer 25, which also has openings 24 for the drainage of seepage water. The retainer 25 has an internal thread 29 into which the extension element 15 can be screwed. Furthermore, the retainer 25 comprises the aforementioned recess 35 for limiting its movement in horizontal direction RH. The retainer 25 further comprises a flange 67 with a circular outer contour 26. The outer contour 26 has a diameter D1 which is smaller than a diameter D2 of the receptacle 40. The retainer 25 can thus be inserted into the receptacle 40.

Figure 12:
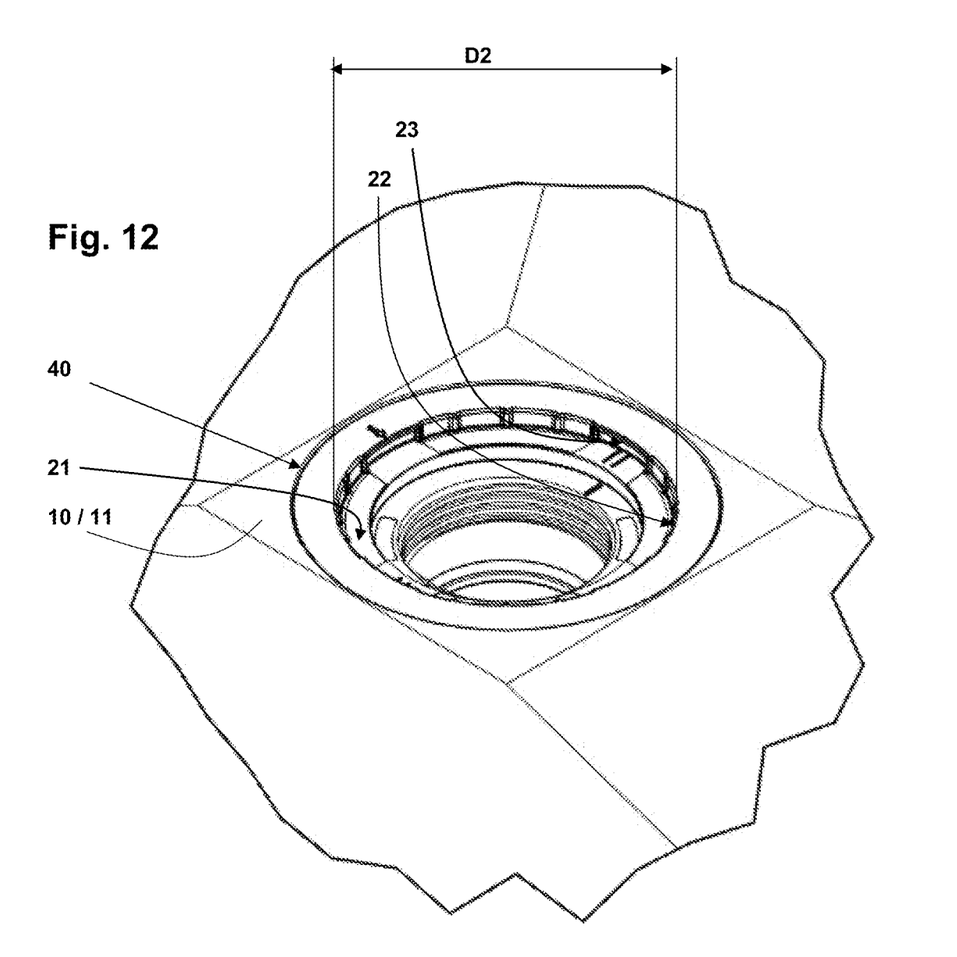
FIG. 12 is a receptacle built into a floor panel in a perspective view.
Figure 13:
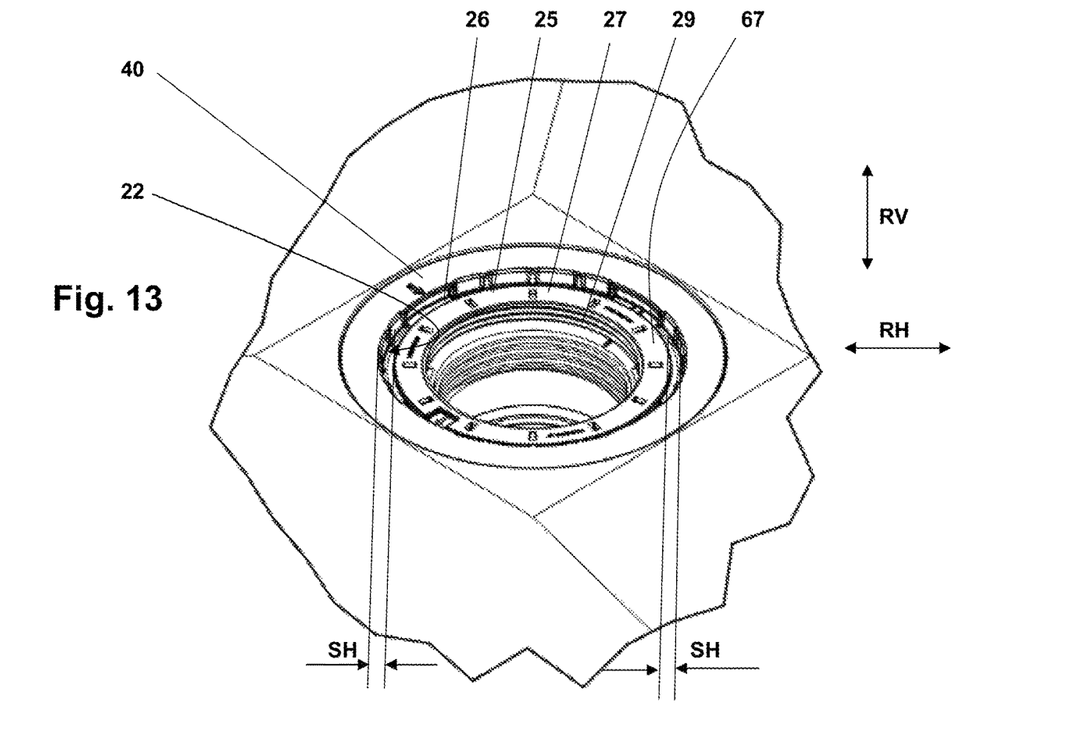
FIG. 13 is a perspective view of the receptacle according to FIG. 12 with the retainer installed according to FIG. 11.
Figure 14:
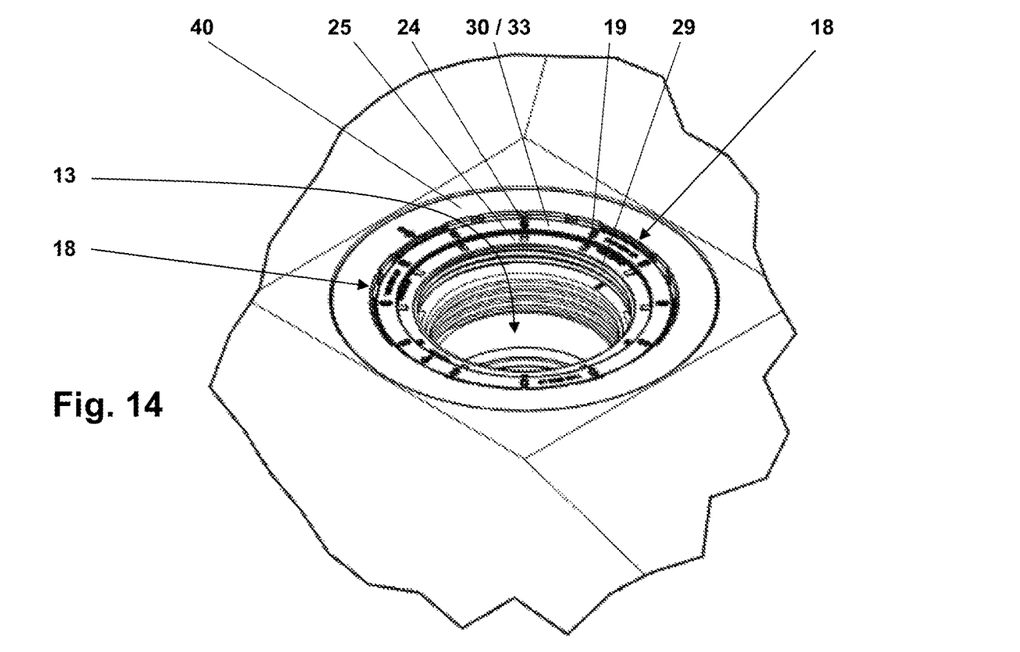
FIG. 14 is a perspective view of the receptacle with retainer and snap ring in the pre-assembled state.

FIGS. 12 to 14 show the shower floor panel 11 with inserted receptacle 40 in various stages of pre-assembly.

In FIG. 12, only the receptacle 40 is inserted into the opening 12 of the floor panel 10. From the lower side of the floor panel 10, the base part 20 of the adapter 200 is screwed to the receptacle 40. The receptacle 40 has an inner contour 22 with a bearing surface 21 and recesses 23.

FIG. 13 shows the receptacle 40 with the retainer 25 inserted. The retainer 25 rests with its flange 67 on the bearing surface 21 of the receptacle 40 and is movable in the horizontal direction RH within the horizontal play SH.

FIG. 14 shows the receptacle 40 with the snap ring 33 mounted. The snap ring 33 is detachably connected to the receptacle 40 via the snap-fit connection 18. This installation situation represents the pre-assembled state Z1, in which the retainer 25 (not shown in FIG. 14) is movable in the housing-like structure formed by snap ring 33 and receptacle 40 and can thus be adjusted as required.

FIGS. 15 to 23 show the adapter 200 already mentioned above and its components. The adapter 200 serves to couple a water inlet inserted into the floor panel 10 to the drain pipe 16 in a watertight manner. The adapter 200 thus has two coupling points, namely the first coupling point 41, at which it is coupled to the drain pipe 16, and the second coupling point 42, at which it is coupled to the water inlet or to the receptacle 40 integrated in the water inlet (cf. FIG. 2).

In the illustrated exemplary embodiment, the drain device 100 comprises both an adjusting device 150 and an adapter 200. Further above, the details of the receptacle 40 with specific features for integrating an adjusting device 150 have already been described. However, with regard to the adjusting device 150, it is irrelevant whether a drain device on which the adjusting device 150 is to be used comprises an adapter 200. Analogously, with regard to the adapter 200, it is also irrelevant whether the drain device 100 comprises an adjusting device 150. Rather, both assemblies can be universally integrated into a drainage device either alone or together.

Figure 15:
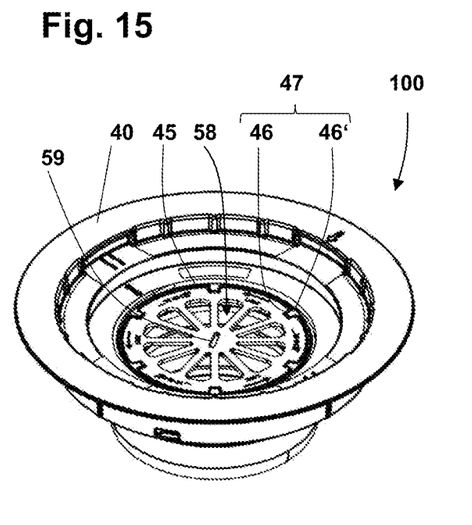
FIG. 15 is an adapter coupled to a receptacle in a perspective view.
Figure 16:
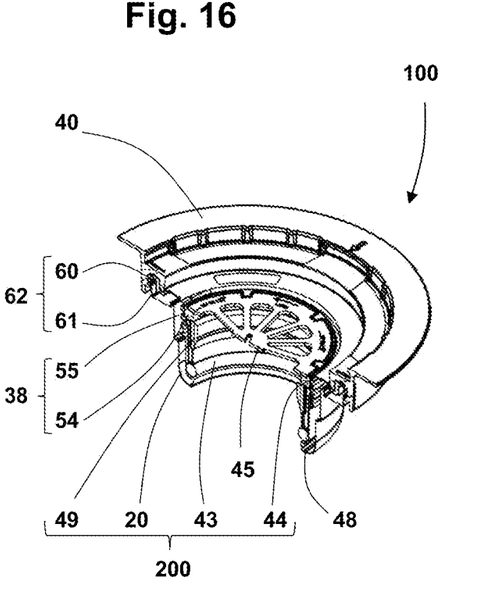
FIG. 16 is a perspective sectional view of the adapter coupled to the receptacle according to FIG. 15.

FIGS. 15 and 16 show the drain device 100 which, on the one hand, comprises the adapter 200 and, on the other hand, is also intended to integrate an adjusting device 150. This is evident from the fact that the receptacle 40 shown in FIGS. 15 and 16 also comprises features of the adjusting device 150.

As already mentioned, the adapter 200 comprises two coupling points 41 and 42. The function of the adapter 200 in association with the first coupling point 41 is to produce a watertight connection between the base part 20 and the drain pipe 16. This fixed connection is the press-fit connection 56 already mentioned in reference to FIG. 2. In a simple embodiment, it can be provided that the press-fit connection 56 with respect to the drain pipe 16 is realized solely by an adapter with the components base part 20, sealing ring 43 and compression ring 44. In the exemplary embodiment shown, however, the adapter 200 also comprises the spacer 49 and the insert 45.

The press-fit connection 56 is achieved by a screw connection 38. The screw connection 38 is formed by an internal thread 54 arranged on the base part 20 and an external thread 55 arranged on the compression ring 44. The compression ring 44 can thus be screwed into the base part 20. The base part 20 has a lower collar 48 on its underside with an inner diameter D3 that is smaller than an outer diameter D4 provided on the sealing ring 43. With a base part 20 fitted onto the drain pipe 16 with the sealing ring 43 arranged on the collar, the sealing ring 43 cannot therefore move downwards out of the base part 20. Rather, it is crimped when the compression ring 44 is screwed deep enough into the base part 20. By crimping the sealing ring 43, the aforementioned press-fit connection 56 can be realized.

In the exemplary embodiment shown in FIGS. 15 and 16, the adapter 200 further comprises the spacer 49 and the insert 45. However, these parts are not absolutely necessary for making the press-fit connection 56. Rather, the press-fit connection 56 can also be produced by pressing the compression ring 44 directly against the sealing ring 43 without the spacer 49 acting as a spacer. For this purpose, the compression ring could, for example, have a cylindrical contour similar to the contour of the spacer, so that the compression ring acts simultaneously as a spacer and as a pressing means.

The inclusion of an insert 45 in the adapter 200 is also not mandatory. The insert 45 is provided for screwing the compression ring 44 into the base part 20. This insert part 45 comprises connecting elements 46' for producing a positive connection 47 with compatible connecting elements 46 on the compression ring 44. In addition, the insert 45 comprises a receptacle 59, which in the exemplary embodiment shown is a slot for attaching a screwdriver. By means of the screwdriver, the insert 45 and the compression ring 44 coupled to the insert can be easily screwed into the base part 20.

The insert 45 thus forms an insertion aid. The compression ring 44 can also be screwed into the base part 20 without the insert 45. If an adapter 200 is to be used without an insert 45, the compression ring 44 could, for example, comprise a shoulder onto which a screwing-in tool can be placed directly, so that a sufficiently strong press-fit connection can be made without using an insert 45.

Figure 17:
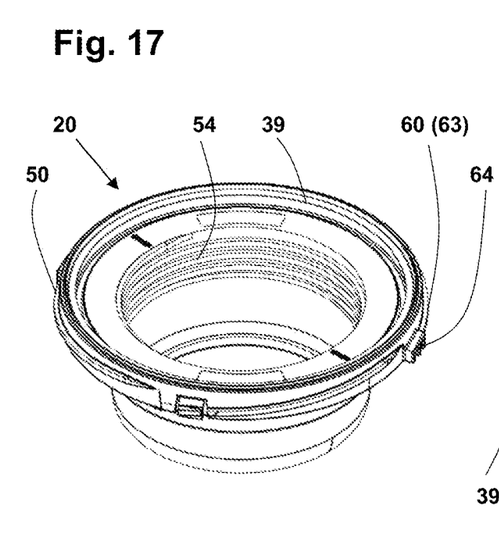
FIG. 17 is the base part of the adapter in a perspective view.
Figure 18:
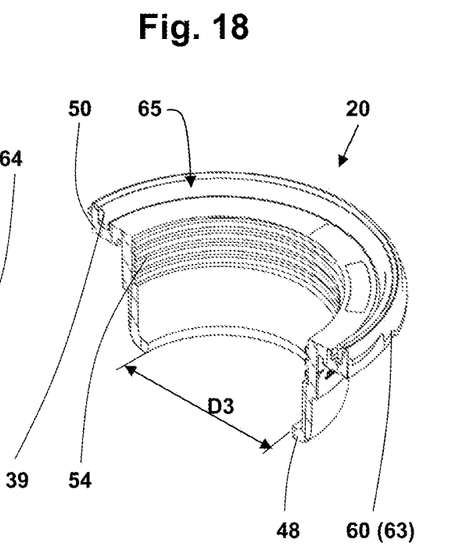
FIG. 18 is the base part of the adapter according to FIG. 17 in a perspective sectional view.

FIGS. 17 and 18 show the base part 20 of the adapter 200. At the lower end is the lower collar 48, which has the inner diameter D3. In the assembled state, the sealing ring 43 is arranged on the lower collar 48. Furthermore, it can be seen that the base part 20 has an upper collar 50 with a U-shaped recess 65 into which a seal 39 is glued.

The base part 20 has an external thread 60 arranged on the upper collar 50, which together with an internal thread 61 arranged on the receptacle 40 forms a screw connection 62 and thus the second coupling point 42. In order to seal this coupling point 42 in a watertight manner, the circular seal 39 glued into the base part 20 is provided in the exemplary embodiment shown. When the external thread 60 is screwed into the internal thread 61, i.e., when the base part 20 is screwed into the receptacle 40, the seal 39 is pressed against a circular contour provided in the receptacle 40. As the depth of engagement increases, the seal 39 is compressed to such an extent that water draining through the drain device 100 cannot exit the drain device 100 at the second coupling point 42, but rather the second coupling point 42 is reliably sealed.

The external thread 60 is arranged on the upper collar 50 of the base part 20 and comprises part of a bayonet catch 63. The other part of the bayonet catch 63 is integrated into the internal thread 61 of the receptacle 40 (cf. FIG. 7). A catch 64 is located on the upper collar 50, which then snaps into a recess provided on the receptacle 40 when the base part 20 is screwed sufficiently deep into the receptacle 40. The engagement of the catch 64 can be felt when it is twisted in, so that the person assembling the drain device 100 receives a haptic and/or acoustic signal that the predefined twisting depth has been reached. In addition, once the catch 64 has engaged, the base part 20 can only be unscrewed from the receptacle 40 if the catch 64 has previously been pushed out of the recess, for example by means of a screwdriver. The catch 64 thus secures the base part 20 against unintentional unscrewing.

Figure 19:
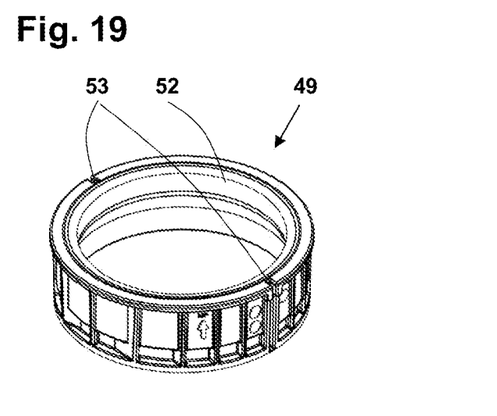
FIG. 19 is the spacer of the adapter in a perspective view.
Figure 20:
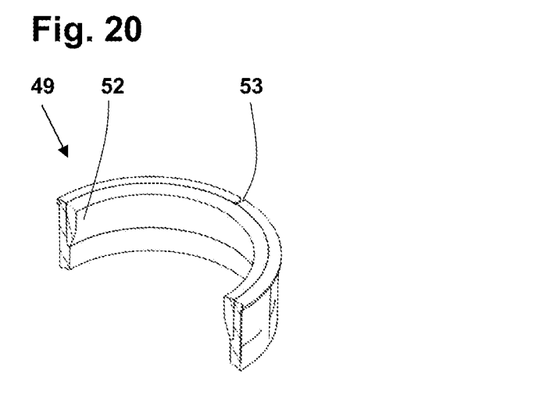
FIG. 20 is the spacer of the adapter according to FIG. 19 in a perspective sectional view.

FIGS. 19 and 20 show the spacer 49 provided in the exemplary embodiment shown. The spacer 49 has a cylindrical shape and acts as a distance piece between the compression ring 44 and the sealing ring 43. When the compression ring 44 is screwed in, the spacer 49 is inserted linearly along its central axis into the base part 20 and finally presses on the sealing ring 43. The sealing ring 43 in turn rests on the lower collar 48 of the base part 20 and is crimped by the screwing in of the compression ring 44, thus forming the press-fit connection 56. In the exemplary embodiment shown, the spacer 49 further comprises a bonded sealing ring 52 which is dimensioned to form a low resistance press fit with the drain pipe 16 when assembled.

The spacer 49 also has two nominal separation points 53 at which it can be easily separated into two half-shell-like individual parts, for example by means of a cutter knife. As already explained above, such a division of the spacer 49 is particularly helpful if a spacer 49 was inadvertently forgotten to be inserted into the base part 20 during assembly and, moreover, the upper inlet opening of the drain device 100 is too small to subsequently push the spacer 49 through and place it in the intended location. A spacer 49 divided into two half shells can thus also be pushed through an inlet opening that is too small for an undivided spacer 49.

Figure 21:
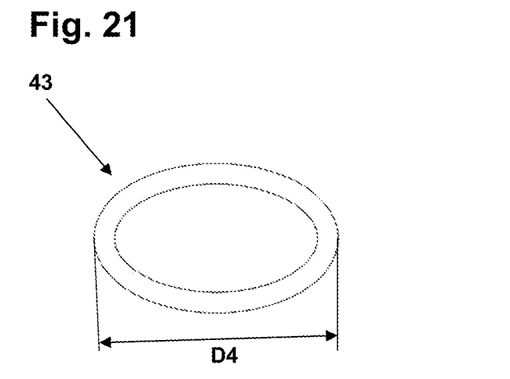
FIG. 21 is the sealing ring of the adapter in a perspective view.

FIG. 21 shows the sealing ring 43, which is a standard sealing ring made of a flexible material with an outer diameter D4.

Figure 22:
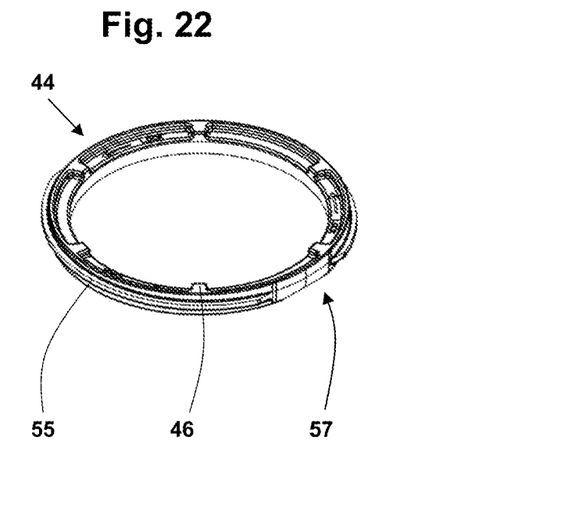
FIG. 22 is the compression ring of the adapter in a perspective view.

FIG. 22 shows the compression ring 44 with the connecting elements 46 arranged on the upper side for producing the form-fit connection 47 to the insert 45. Furthermore, a flattened area can be seen on the external thread 55, which forms part of the bayonet catch 63. The internal thread 54 of the base part 20, which is compatible with this external thread 55, also has a flattened area analogously. If the base part 20 and compression ring 44 are rotated with slight pressure and come into the position where the two flattened areas overlap, the bayonet catch 63 engages and thereby positions the base part 20 and compression ring 44 in relation to each other in such a way that the risk of canting—and thus: the risk of thread damage—is reduced.

Figure 23:
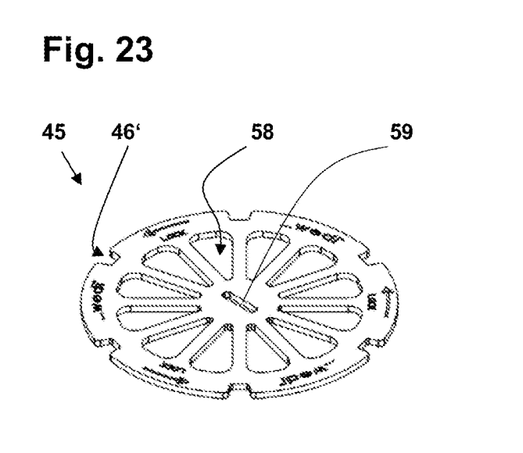
FIG. 23 is an insertable part that can be inserted into an adapter.

FIG. 23 shows the insert 45 with the connecting elements 46', which in the exemplary embodiment shown are U-shaped notches made in the outer contour. Furthermore, the insert 45 comprises openings 58 through which the waste water entering through the inlet opening can flow towards the drain pipe 16. The insert 45 is therefore not only used to screw in the compression ring 44, but rather can remain in the drain device 100 after the compression ring 44 has been screwed in. On the one hand, this ensures that the insert 45 is always there when disassembly is required, for example for maintenance work. On the other hand, the insert 45 has a sieve-like effect and reduces the risk of blockages in the drainage system.

On the insert 45 there are also arrows indicating the direction of rotation for screwing the compression ring 44 into the base part 20. In the present case, it is intended that the insert part 45—as seen in top view—is to be turned counter-clockwise in order to make the press-fit connection 56. However, if the insert 45 is rotated, some of the torque may be transmitted to the base part 20 under certain conditions, for example if the screw connection 38 is difficult to turn. It is therefore not impossible that the base part 20 rotates when the compression ring 44 is screwed into the base part 20. However, the base part 20 has the further screw connection 62 by means of which it is screwed into the receptacle 40. In order to prevent the screw connection 62 from being loosened when the compression ring 20 is screwed in, the directions of rotation of the two screw connections 38 and 62 are designed in such a way that when the compression ring 44 is tightened, in the case where part of the torque is transmitted to the screw connection 62, i.e., to the connection point to the receptacle 40, this second screw connection 62 is not loosened, but rather additionally tightened.

LIST OF REFERENCES

10 floor panel
11 shower floor panel
12 opening (in 10 or 11)
13 inlet opening (in 100)
14 cover (for 13)
15 extension element (for 14)
16 drain pipe
17 external thread (of 15)
18 snap-fit connection
19 opening (in 30)
20 base part (of 200)
21 bearing surface
22 inner contour (of 20)
23 recess (in 20)
24 opening (in 25)
25 retainer (for 15)
26 outer contour (of 25)
27 upper side (of 25)
28 underside (of 25)
29 internal thread (of 25)
30 fixing element
31 upper side (of 30)
32 underside (of 30)
33 snap ring
34 projection (on 30)
35 recess (in 25)
36 projection (on 30)
37 -
38 screw connection (of 44 and 20)
39 seal (in 20)
40 receptacle
41 first coupling point
42 second coupling point
43 sealing ring (in 200)
44 compression ring
45 insert (sieve)
46, 46' connecting element
47 connection (of 44 and 45)
48 lower collar (on 20)
49 spacer
50 upper collar (on 20)
51 pipe stub
52 seal (in 49)
53 nominal separation point (on 49)
54 interior thread (on 20)
55 external thread (on 44)
56 press-fit connection
57 bayonet catch
58 openings
59 receptacle (in 45)
60 external thread (on 20)
61 internal thread (on 40)
62 screw connection (of 20 and 40)

63 bayonet catch
64 catch
65 recess (on 20)
66 intermediate support (below 14)
67 flange (on 25)
68 openings (in 15)
69 flange (on 15)
70 length piece (on 15)
100 drain device
150 adjusting device
200 adapter
A1 section view (from FIG. 4)
A2 section view (from FIG. 6)
D1 outer diameter (of 25)
D2 inner diameter (of 40)
D3 inner diameter (of 48)
D4 outer diameter (of 43)
RH direction (horizontal)
RV direction (vertical)
SH horizontal play
SV vertical play
Z1 pre-assembled state

The invention claimed is:

1. An adapter (200) for a drain device (100) that is provided for installation in an opening (12) of a floor panel (10), preferably a shower floor panel (11), and wherein the drain device (100) comprises:
  a receptacle (40) for the installation in the floor panel (10) with an upper inlet opening (13) through which waste water can flow into the drain device (100), and
  parts which can be preassembled in the floor area and which can be connected in a fluidic manner to a drain pipe (16) and the receptacle (40), so that waste water which has passed through the inlet opening (13) can enter the drain pipe (16),
  wherein the adapter (200) comprises the following components:
  a base part (20) having an internal thread (54), wherein the base part (20) comprises a first coupling point (41) to the drain pipe (16) and a second coupling point (42) to the receptacle (40) and couples the receptacle (40) to the drain pipe (16) in the assembled state,
  a sealing ring (43) that can be installed in the base part (20) to seal the adapter (200) from the drain pipe (16), and
  a compression ring (44) with a outer thread (55) compatible to the inner thread (54) of the base part (20) for exerting a compressive force on the sealing ring (43), whereby the sealing ring (43) can be pressed against the drain pipe (16) by means of the compression ring (44) and the first coupling point (41) comprises a press-fit connection (56).

2. The adapter (200) as claimed in claim 1, further comprises comprising an insert (45), which can be installed in the base part (20) above the compression ring (44), for clamping the sealing ring (43) installed in the base part (20), wherein the compression ring (44) and the insert (45) preferably have mutually compatible connecting elements (46, 46') for producing a positive-fit connection (47), so that a torque exerted on the insert (45) can be transmitted to the compression ring (44).

3. The adapter (200) as claimed in claim 2, wherein the insert (45) comprises openings (58) for collecting impurities present in the waste water, for example hair, and has a sieve-like action.

4. The adapter (200) as claimed in claim 2, wherein the insert (45) has a receptacle (59) for a tool, in particular a screwdriver, so that the insert (45) can be screwed into or unscrewed from the adapter by means of a tool.

5. The adapter (200) as claimed in claim 1, further comprising a spacer (49) provided between sealing ring (43) and compression ring (44).

6. The adapter (200) as claimed in claim 5, wherein the spacer (49) comprises a seal (52) for forming a guide with respect to the drain pipe (16).

7. The adapter (200) as claimed in claim 6, wherein the seal (52) is adhesively bonded in the spacer (49).

8. The adapter (200) as claimed in claim 5, wherein the spacer (49) has at least one nominal separation point (53) at which it can be divided.

9. The adapter (200) as claimed in claim 1, wherein the first coupling point (41) comprises a bayonet catch (57).

10. The adapter (200) as claimed in claim 1, further comprising a thread (60) provided on the base part (20) which is compatible to a thread (61) applied to the receptacle (40), so that the second coupling point (42) is formed by a screw connection (63) which couples the base part (20) to the receptacle (40).

11. The adapter (200) as claimed in claim 10, wherein the thread (60) of the base part (20) is a first part of a bayonet catch (63), which is compatible to a second part of the bayonet catch (63) attached to the receptacle (40).

12. The adapter (200) as claimed in claim 10, wherein the second coupling point (42) comprises a catch (64), which can be snapped into a recess compatible therewith in the receptacle (40) so that the base part (200), which can be screwed into the receptacle (40), can be fixed and secured against unscrewing.

13. The adapter (200) as claimed in claim 1, wherein the first coupling point (41) for connecting the adapter (200) to the drain pipe (16) and the second coupling point (42) for connecting the adapter (200) to the receptacle (40) each comprise a thread oriented in opposite directions, so that when one coupling point (41, 42) is tightened, the other coupling point (41, 42) is also tightened.

* * * * *